United States Patent [19]
Arato et al.

[11] Patent Number: 5,592,603
[45] Date of Patent: Jan. 7, 1997

[54] METHOD OF AND APPARATUS FOR CUSTOMIZING USER INTERFACE

[75] Inventors: Yoshihiro Arato, Tokyo; Chiaki Ishimura, Chigasaki, both of Japan

[73] Assignee: Hitachi, Ltd., Tokyo, Japan

[21] Appl. No.: 207,272

[22] Filed: Mar. 7, 1994

[30] Foreign Application Priority Data

Mar. 16, 1993 [JP] Japan .................................. 5-056137

[51] Int. Cl.⁶ ...................................... G06F 3/14
[52] U.S. Cl. ...................................... 395/334
[58] Field of Search ........................... 395/155, 156, 395/157, 158, 159, 160, 161

[56] References Cited

U.S. PATENT DOCUMENTS

| 5,182,796 | 1/1993 | Shibayama | 395/156 |
| 5,327,529 | 7/1994 | Fults et al. | 395/155 |
| 5,347,623 | 9/1994 | Takano et al. | 395/157 |

FOREIGN PATENT DOCUMENTS 2135517  5/1990  Japan .

OTHER PUBLICATIONS

"Individual Shared Calendar Profiles," *IBM Technical Disclosure Bulletin*, vol. 32, No. 9B, Feb. 1990, pp. 219–220. (English).

"Menu Selection Method for Related Attributes," *IBM Technical Disclosure Bulletin*, vol. 33, No. 6B, Nov. 1990, pp. 423–425. (English).

UIBT Operation Manual (3050-7-404-10), Hitachi, pp. 67–71 and 76–84, 1992 (provided in Japanese).

*Primary Examiner*—Mark R. Powell
*Assistant Examiner*—Ruay Lian Ho
*Attorney, Agent, or Firm*—Fay, Sharpe, Beall, Fagan, Minnich & McKee

[57] ABSTRACT

Items selected and set in a process up to the completion of the selection and setting operation achieved by the user for a plurality of items displayed in a screen image are memorized for each selection and setting operation. In an operation to be executed later by use of the items thus selected and set, there is displayed a screen image including the memorized selection items.

8 Claims, 9 Drawing Sheets

FIG. 8
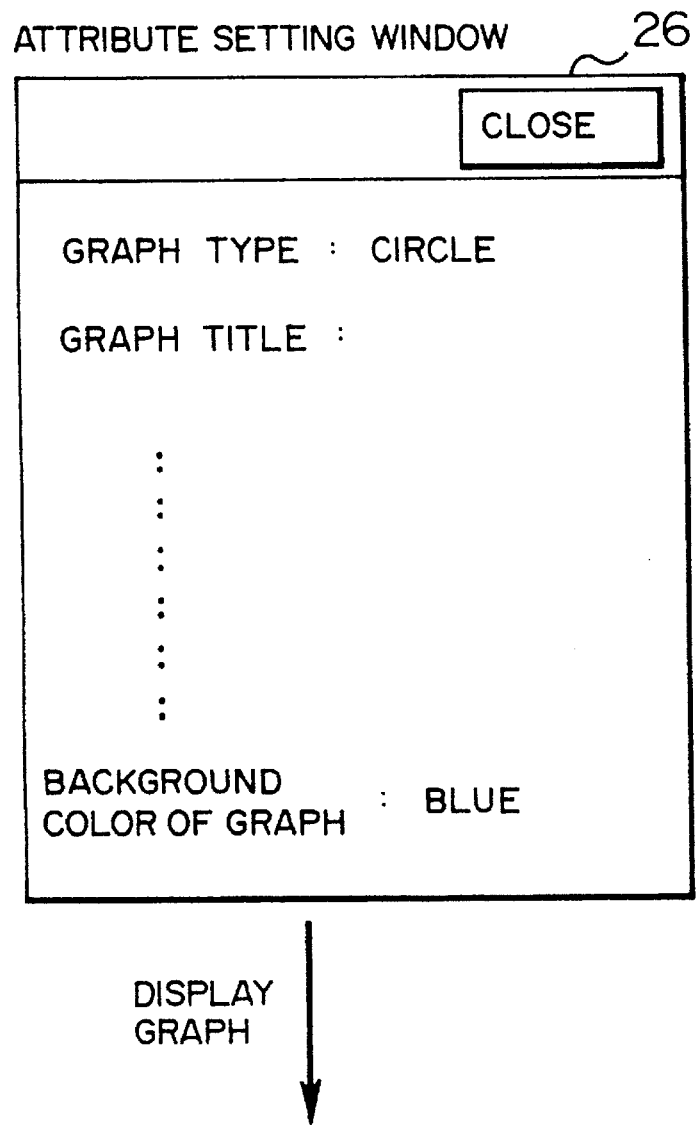
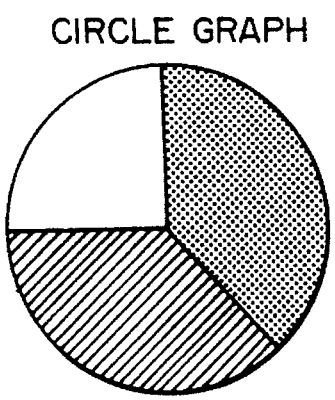

FIG. 9

ATTRIBUTE CORRELATION
DEFINITION SCREEN IMAGE — 47

| ATTRIBUTE ID | ATTRIBUTE NAME | ADDITIONAL ATTRIBUTE NAME | | | |
|---|---|---|---|---|---|
| 1 | GRAPH TYPE | 2 | 3 | .... | |
| 2 | LINE TYPE | | | .... | |
| 3 | TITLE | 8 | 10 | .... | |
| 4 | AXIS GRATICULE | | | .... | |
| ⋮ | ⋮ | | | ⋮ | |
| n | SECTORAL LABEL | 8 | | .... | |

471 — ATTRIBUTE ID
472 — ATTRIBUTE NAME
473 — ADDITIONAL ATTRIBUTE NAME

METHOD OF AND APPARATUS FOR CUSTOMIZING USER INTERFACE

BACKGROUND OF THE INVENTION

The present invention relates to an information processing system in which a selection and setting operation is conducted by a user for a plurality of items displayed on a display screen, and in particular, to a method and an apparatus for customizing a user interface with the display screen.

In the society today where information is quite valuable as a resource, operability is an issue to be emphasized in information processing systems for efficiency improvement of the user.

The user processes a great amount of information through an information processing system such as a workstation and a personal computer in many cases. However, to complete processing of information of a certain type, there are required a series of operations such as a data input operation, dialog open and close operations, and selections of items (data items, work items, and/or processing procedure item names). These operations are conducted in most cases through routine jobs in which similar operations are repeatedly executed.

For example, in a case where data beforehand created is displayed in the form of a graph, it is necessary to set attributes such as a type of graph (circle, bar, or broken-line graph); types of lines, colors, graticule, reference lines; a graph drawing area, and a title name for the graph. Since these setting operations are carried out for each graph and hence forms a routine job in which the similar operations are repeatedly effected as many as there are graphs.

In this situation, there arises a problem of how to efficiently materialize the interface with the user in the information processing system of this kind and hence there have been heretofore provided various user interface configurations or systems.

However, either one of the user interface systems is configured such that items beforehand prepared in the system are displayed in the display screen for the user to select only the necessary items therefrom so as to set the items.

In this connection, a method of setting attributes of a graph in an operation to create a graph has been described in a manual "UIBT Operation (3050-7-404-10)".

In this regard, from a viewpoint of each user, the selection and setting operation is rarely conducted for all items displayed on the display screen. Namely, in many cases, the selection and setting operation is required to be carried out only for a portion of the items.

For example, in order to display a plural pairs of data items in an identical graph format, when the color and the width of lines are not limited, namely, are allowed to be arbitrarily set, there need only be achieved the selection and setting operation for the attributes such as a graph type and a graph drawing area.

However, the conventional user interface systems are configured as described above such that all items beforehand prepared in the system are presented in the display screen for the user to select therefrom and to set only the necessary items in an item-by-item fashion.

In consequence, there arises a problem that the selection and setting operation only for the necessary items requires a long period of time and is troublesome. Particularly, in a case where the items to be selected astride a plurality of screens or where only a portion of a setting item is to be changed or in a case where an identical routine operation is repeatedly carried out, there exists a problem that the operation is onerous and inefficient.

SUMMARY OF THE INVENTION

It is therefore an object of the present invention to provide a method of and an apparatus for customizing a user interface in which a user interface with the display screen can be customized, thereby enabling the user to effectively accomplish the selection and setting operation only for the necessary items.

In order to achieve the object above, according to the present invention, there are disposed storage means for storing therein for each selection and setting operation items selected and set in a process in which the user completely accomplishes the selection and setting operation for the plural items displayed on the display screen, and there is displayed, in an operation to be executed later by utilizing the items thus selected and set, a screen image including selection items stored in the storage means.

Moreover, there is disposed storage means for storing therein for each changing operation only items for which the changing operation is conducted by the user in the plural items displayed on the display screen, and there is displayed, in an operation to be executed later by utilizing the items thus selected and set, a screen image including items stored in the storage means.

In addition, there is disposed item specifying means for specifying items to be selected and to be set by the user, and there is displayed a screen image including items specified by the item specifying means.

Furthermore, there are disposed defining means for beforehand defining relationships between the plural items and storage means for storing therein for each selection and setting operation selection items selected and set in a process in which the user completely accomplishes the selection and setting operation for the plural items displayed on the user interface screen and relational items defined by the defining means. There is displayed, in an operation executed later by utilizing the items thus selected and set, a screen image including items stored in the storage means.

According to the present invention, there are memorized for each selection and setting operation items selected and set in a process in which the user completely accomplishes the selection and setting operation for the plural items displayed on the display screen. There is displayed, in an operation executed later by utilizing the items thus selected and set, a screen image including selection items stored in the storage means.

That is, of the items prepared in the system, only the selection items selected by the user as necessary items are memorized. Thereafter, a screen image including the memorized items is displayed as a screen image unique to the user. Namely, the items decided to be unnecessary for the user are not displayed.

In consequence, once items necessary for an execution of a certain operation are selected and set, there is displayed a screen image including only the necessary items. The necessary items can be reconfirmed or changed therein; consequently, the user can efficiently select and set necessary items through quite a simple operation.

Moreover, there is displayed a screen image including only the items for which a change operation is conducted by the user in the plural items displayed on the display screen.

Consequently, like in the case above, the user can efficiently conduct the selection and setting operation for necessary items through quite a simple operation.

In addition, there is presented a screen image including the items specified by the item specifying means. Consequently, in the case above, the user can efficiently select and set necessary items through quite a simple operation.

Additionally, since there is displayed, in addition to the items undergone the selection and setting operation, relational items defined by the defining means, the relational items can also be effectively selected and set through quite a simple operation while confirming correlations.

BRIEF DESCRIPTION OF THE DRAWINGS

These and other objects and advantages of the present invention will become apparent by reference to the following description and accompanying drawings, wherein:

FIG. 8 is an explanatory diagram useful to explain a graph display example in a case where attributes are changed in the screen image after the attribute registration; and FIG. 9 is a screen image configuration diagram showing a screen to define correlations between attributes in the second embodiment according to the present invention.

DESCRIPTION OF THE PREFERRED EMBODIMENTS

Figure 1:
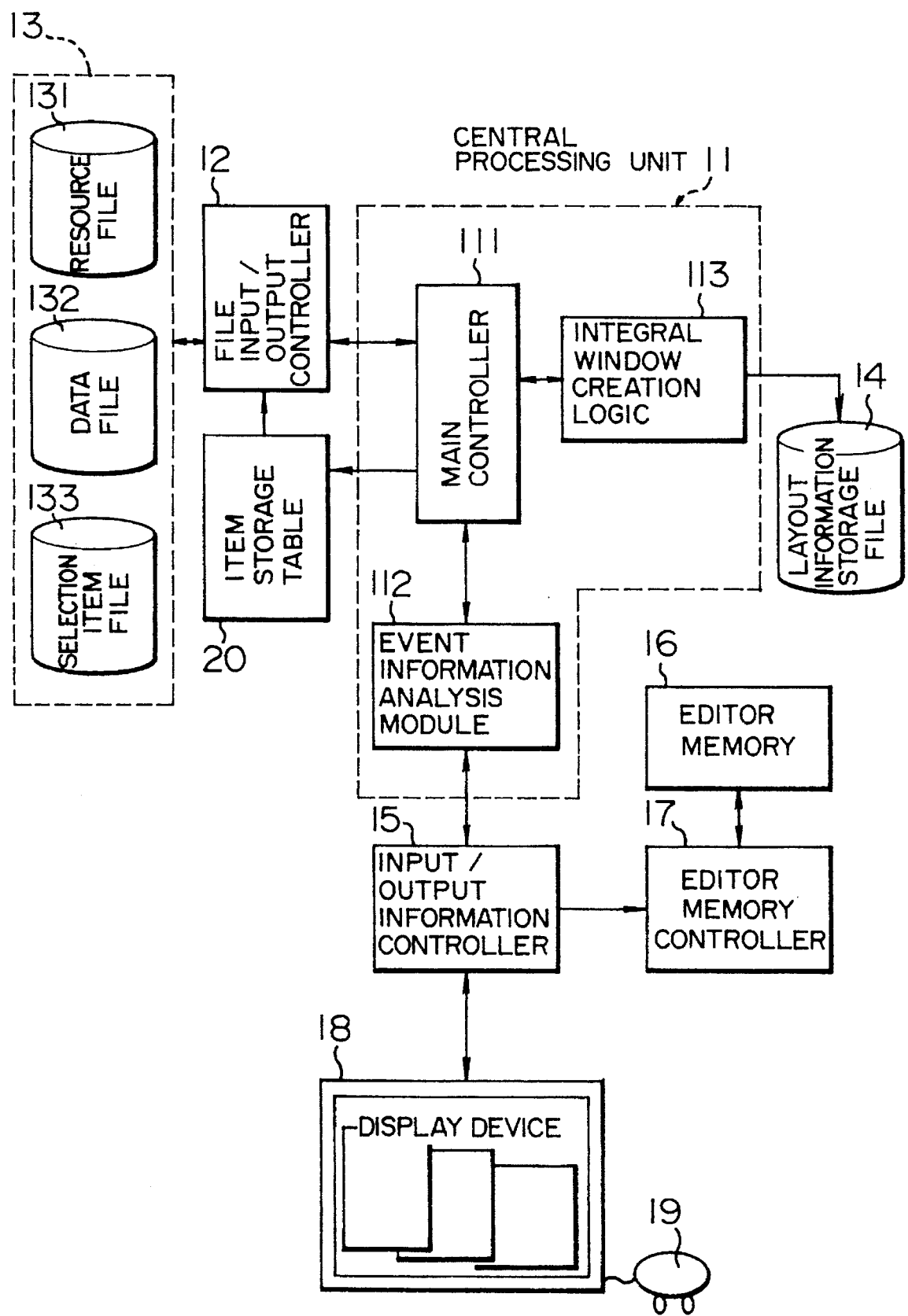
FIG. 1 is a block diagram showing the first embodiment of an information processing system to which a user interface customizing method is applied according to the present invention.

Referring now to the drawings, description will be given of an embodiment according to the present invention.

FIG. 1 is an overall block diagram showing a first embodiment of an information processing system to which the present invention is applied.

In the diagram, numeral 11 indicates a central processing unit which is a primary portion of the information processing system and includes a main control device 111, an event information analysis module 112, and an integral window generation logic 113.

In this configuration, the overall system processing flow is controlled by the controller 111, event information (such as item specifications and selection specifications) inputted by a user is analyzed by the module 112, and a window is generated by the logic 113 to display information in response to a request from the controller 111. Information displayed in the window is a set including parts such as character strings, buttons, and menus. The logic 113 conducts processing, for example, to store and,or to extract a layout of these parts in a window and/or layout information thereof.

Numeral 12 denotes a file input/output control device to exchange data between the central processing unit 111 and the file group 13. The controller 12 carries out operations, for example, to store information sent from the unit 111 and to retrieve information requested therefrom.

Numeral 13 indicates a group of files for storing therein information items such as resources, data, and selection items specified by the user and primarily includes a resource file 131 for storing therein parts necessary for the display operation, a data file 132 for storing therein such data created by the user as table data and graph data, and a selection item file 133 for storing therein selection items extracted according to a user interface customizing method of the present invention.

Numeral 14 designates a layout information file for storing therein information of display parts undergone the layout operation by the logic 113. In this file 14, there is stored such information items necessary to create a window such as storage address and a part number of each part and various setting values to be displayed in the window.

Numeral 15 stands for an input/output control device for controlling transfers of information items such as events and data inputted by the user via the screen. In this system, data is communicated between the event information analysis module 112 and the display.

Numeral 16 denotes an editor memory for temporarily storing therein items to be displayed on a screen. Storing in the editor memory 17 the items for the selection and setting operation causes the items on the screen to be modified and/or changed.

Numeral 17 indicates an editor memory control device for controlling the screen image display operation and the editor memory 16. When the controller 15 receives items from the main control unit 111, the items are displayed on the display screen. Moreover, to store information of the items also in the editor memory 16, the controller 17 receives the items from the input/output information controller 15. The received information is then transferred to the editor memory 16 to be stored therein.

Numeral 18 designates a display device to present a plurality of necessary items on a display screen, and numeral 19 stands for an input device for conducting a selection and setting operation for the displayed items and for inputting necessary character strings.

Numeral 20 designates an information storage table for temporarily storing therein information to be stored in the selection item file 133.

Figure 2:
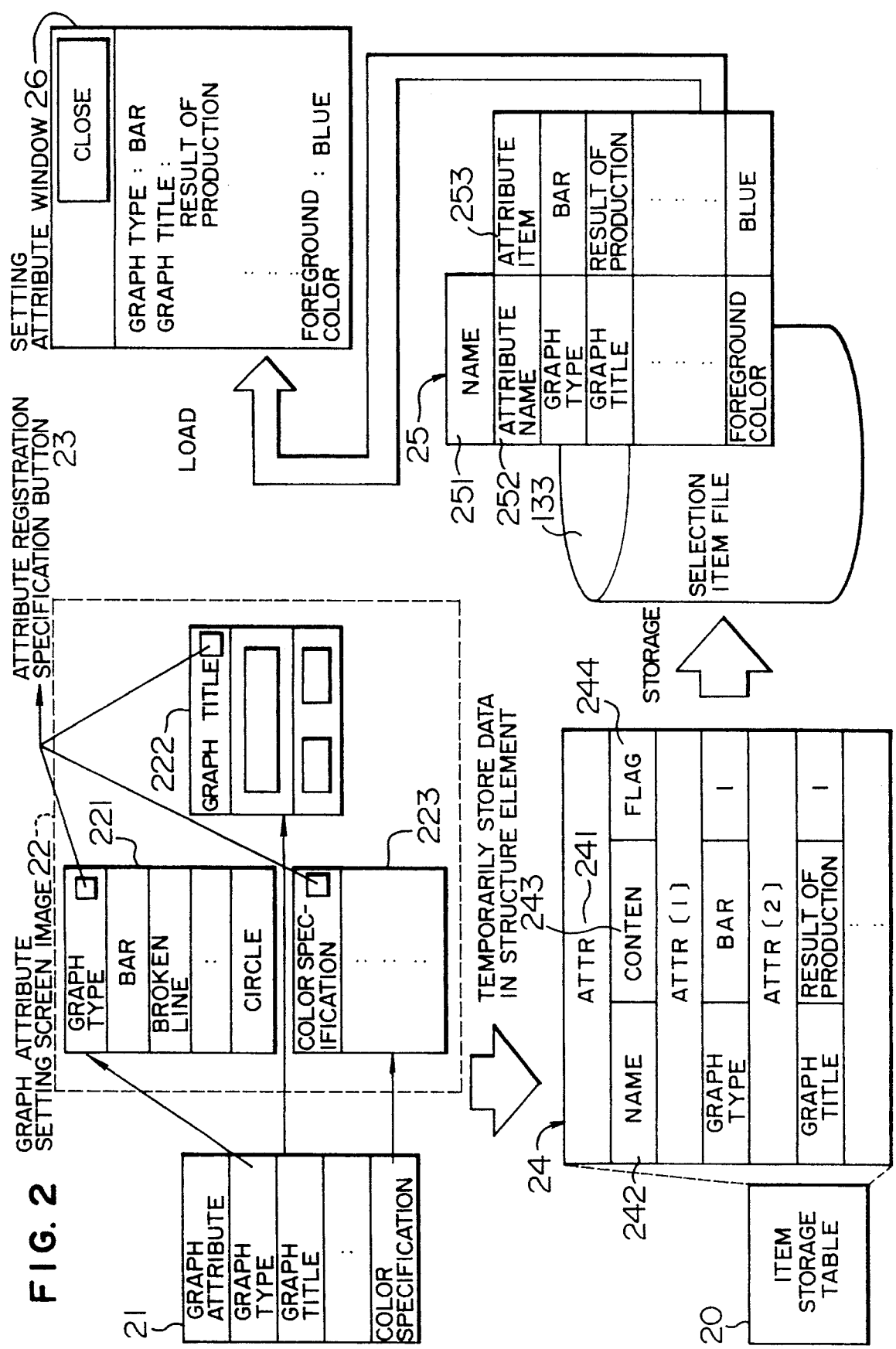
FIG. 2 is an explanatory diagram for explaining flows of data and processing in the first embodiment.

FIG. 2 is an explanatory diagram for explaining a processing flow and a data flow of an operation, which is used in a job of creating a graph according to table data in the system configured as above, to select and to set attribute items of the graph.

In FIG. 2, numerals 21 and 22 indicate screen images to set graph attributes, numeral 23 denotes a button to specify that the graph attributes thus set are to be registered, numeral 24 stands for a data configuration of the item storage table 20, and numeral 26 designates a setting attribute window displayed after customization thereof when data is loaded from the selection item file 133. Opening the window 26 causes the attribute items once selected and set to be again displayed in a list for reuse thereof.

Description will now be given of a data flow and a processing procedure to a point where the graph attributes specified or selected by the user are stored in a completely automatic manner.

First, according to a graph creating function, it is possible to set, for a graph produced from table data, graph attributes such as a graph type, a graph title, an axis graticule, an axis title, legend, a footnote, a graph background color, an item name, a marker, a line type, a character type, and a character size.

Accordingly, the user sets graph attributes in the graph attribute setting screen images 21 and 22 shown in FIG. 2.

In a case where an attribute item, for example, a graph type is desired to be set, "graph type" is selected by the input device 19 from the screen image 21 to display a window 221 of "graph type" in the screen image 22. Thereafter, a graph type, for example, "bar" is selected and is set in the window 221 by the input device 19.

Similarly, to set an attribute item of a graph title, there is selected "graph title" from the screen image 21 by the input device 19 to display a window 222 of "graph title" in the screen image 22. Thereafter, there are inputted as a graph title, for example, characters for "result of production" in the window 222 from the input device 19.

In a similar manner, to set an attribute item of a graph title, "color specification" is selected by the input device 19 from the screen image 21 to display a window 223 of "color specification" in the screen image 22. Thereafter, there is inputted as a color specification a color of, for example, "BLUE" in the window 223 by the input device 19.

The graph attributes thus set are temporarily stored in the item storage table 20 in the attribute setting order.

In this embodiment, the table 20 includes a data structure as indicated by numeral 24 in FIG. 2. That is, the table 20 is an array including attribute structure elements "ATTR" 241 each including three components, namely, "NAME= attribute name" 242, "CONTEN=attribute item" 243, and "FLAG=registration specification decision flag" 244.

In this regard, "NAME" 242 is a graph attribute name such as a graph type, a title, or a color and "CONTEN" 243 denotes the contents (for example, an attribute item such as circle, broken-line, or bar in the case of a graph type) set for "NAME" 242. Moreover, "FLAG" 244 is a flag in which "1" is stored when the attribute is specified to be stored by the user and in which "0" is stored when the attribute is not specified for storage. In this embodiment, when an attribute registration specification button 23 disposed in the graph attribute setting screen image 22 is specified by the input device 19, the attributes selected by the user are stored in the information storage table 20. Furthermore, the flag related to each attribute is set to "1".

Thereafter, only "NAME" 242 and "CONTEN" 243 for which "FLAG" 244 is "1" are finally stored in the item file 133.

The file 133 includes data of an attribute name 252 and data of attribute item 253 undergone the selection and setting operation. These data items are stored therein in a data setting order. The overall configuration is controlled according to a name 251 set in response to specification from the user.

Subsequently, a specific processing procedure of the embodiment will be described by reference to the flowcharts of FIGS. 3 and 4.

First, when operation items to generate a graph are beforehand selected by the user, the input/output information controller 15 receives event information thereof from the display device 18 and then transfers the information to the event information analysis module 112.

Analyzing the inputted event information, the module 112 transmits a result of the analysis to the main controller 111.

When the information indicates a selection of an operation item "graph generation" the controller 111 clears to zero all items of the attribute structure element ATTR 241 including NAME 242, CONTEN 243 and FLAG 244 in the information storage table 20 (step 27). Moreover, from the resource file 131, there are obtained via the file input/output controller 12 parts to be presented on the display device 18 so as to display thereon an initial screen image for graph generation.

For the contents displayed on the initial screen image, when the user inputs a request to set graph attributes, event information indicating the request is transferred via the input/output information controller 15 to the analysis module 112. Analyzing the event information, the module 112 transfers a result of the analysis to the main controller 111.

According to information resultant from the analysis, the main controller 111 issues a retrieval request to the input/output controller 12. According to the inputted request, the controller 12 retrieves from the file 131 information of parts to be displayed in the screen image to set graph attributes and then transfers the information to the main controller 111.

To display the received information in the screen image to set graph attributes, the main controller 111 issues to the integral window creation logic 113 a request to generate a window and to obtain information of a layout for the parts.

The logic 113 generates a window to set the graph attributes and retrieves from the layout information file 14 information of a layout to determine positions of the parts.

The generated window and layout information are each transferred under control of the main controller 111 to the analysis module 112 to be converted into a presentable format so as to be transferred to the input/output information controller 15.

According to the inputted window and parts layout information, the controller 15 presents on the display device 18 the screen image 21 to set items of graph attributes as shown in FIG. 2 and then displays windows 221 to 223 of FIG. 2 in response to a selection and setting operation for a graph type and the like in the setting screen image 21.

In this case, information denoting the contents of the screen image presented on the display device 18 is written also in the editor memory 16. According to the flow, input/output information is communicated between the internal system and the screen images.

Subsequently, the processing to set graph attributes is executed until a request to terminate the attribute setting is inputted from the user (step 28).

First, when the user sets from the input/output device 19 a graph attribute such as a graph type in the screen image 21, the main controller 11 acquires a name and an item of the attribute from the input/output information controller 15 (step 29).

In this situation, when the attribute name thus specified is identical to any one of the attribute names set in the past, the item thereof later specified take precedence. Consequently, search is required to be effected to decide whether or not the attribute structure element 241 beforehand stored in the item storage table 20 contains an attribute name identical to the attribute name currently being set by the user.

For this purpose, a pointer is set to a first position of the table 20 to accomplish the search processing (steps 30 and 31).

Resultantly, when it is determined that there has been set an attribute name (NAME 242) identical to the attribute name to be set by the user (step 32, YES), the contents of the attribute "CONTEN" 243 is replaced with the contents of the setting conducted later (step 33).

However, in a case where such an identical attribute name has been missing up to this point, the pointer of the element ATTR 241 is sequentially updated (step 34) to sequentially achieve the comparison between attribute names until the pointer value takes the final value of the element ATTR 241. When it is finally decided that the identical attribute name is missing, the name and item of the attribute to be set by the user are assigned to NAME 242 and CONTEN 243 (steps 35 and 26).

In addition, when the user designates a specification to register attributes, for example, by pushing the specification button 23 of FIG. 2 in the selection and setting operation (step 37), "1" is moved to FLAG 244 of the element ATTR 241 (step 38) as a marker indicating that the attribute is specified to be registered by the user.

The attribute information set for the graph by the user is transferred via the controller 15 and the analysis module 112 to the main controller 111 so as to be temporarily stored in the element ATTR 241 of the item storage table 20.

To complete the attribute setting, when the user inputs a request to terminate the setting of graph attributes, the pointer is restored to the first position of the element ATTR 241 (step 40) and then the flag judge processing is conducted up to the end of the element ATTR 241 (step 41).

At this point, for any element ATTR 241 for which FLAG 244 is "1", the contents of NAME 242 and CONTEN 243 are stored in the selection item file 133 via the file input/output information controller 12 (steps 42 and 43).

The operation is carried out up to the end value of the pointer while updating the value of the pointer to the element ATTR 241 (steps 44 and 45).

The attribute information thus stored in the file 133 can be read therefrom for re-use thereof in response to an indication of a name or an attribute name of a graph generated by the user in the past.

In this case, data items such as graph data and table data items generated by the user are stored in the data file 132. Like the attribute information, these items can also be read from the file 132 to be used again.

In addition, the attribute information stored in the selection item file 133 can be arbitrarily extracted therefrom in response to a call request issued with an attribute name from the user so as to be combined into a display format by the input/output information controller 15 in accordance with the window and the layout created by the logic 113, thereby displaying the information in a list on the display 18 in a manner similar to the window 26 of FIG. 2.

When a portion of the displayed attribute information is to be modified or to be changed, new contents are set in the window 26. For example, to alter a bar chart into a circle graph, an attribute item "graph type=bar" is altered to "graph type=circle". Thereafter, a button "close" is operated to complete the change operation.

On receiving the new attribute information via the controller 15, the editor memory controller 17 replaces the current attribute information stored in the editor memory 16 with the new attribute information.

The new attribute information thus rewritten is registered to the file 133 in response to the setting. end operation.

Figure 5:
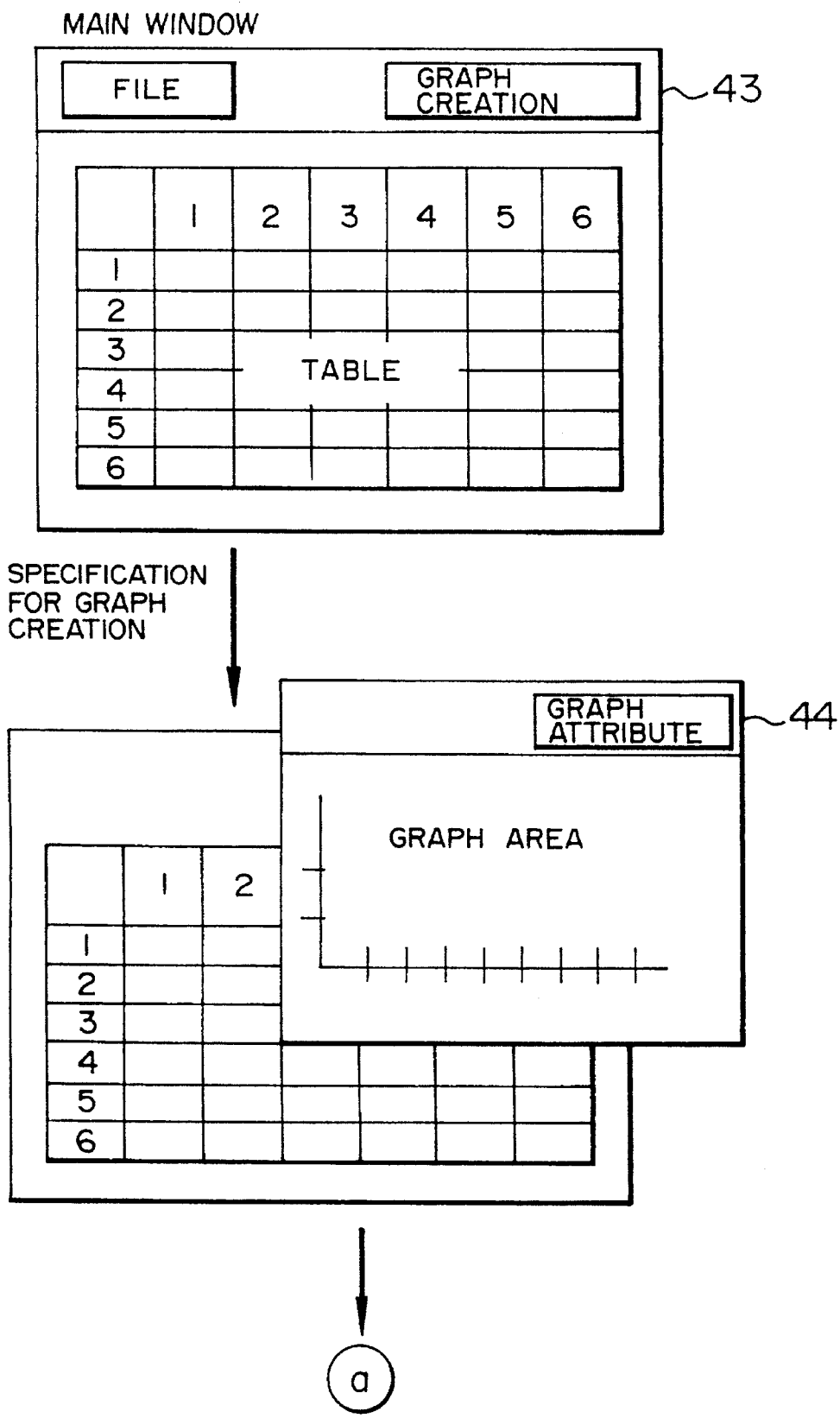
FIG. 5 is a first half configuration diagram showing changes in the screen image contents prior to the attribute registration in the first embodiment.
Figure 6:
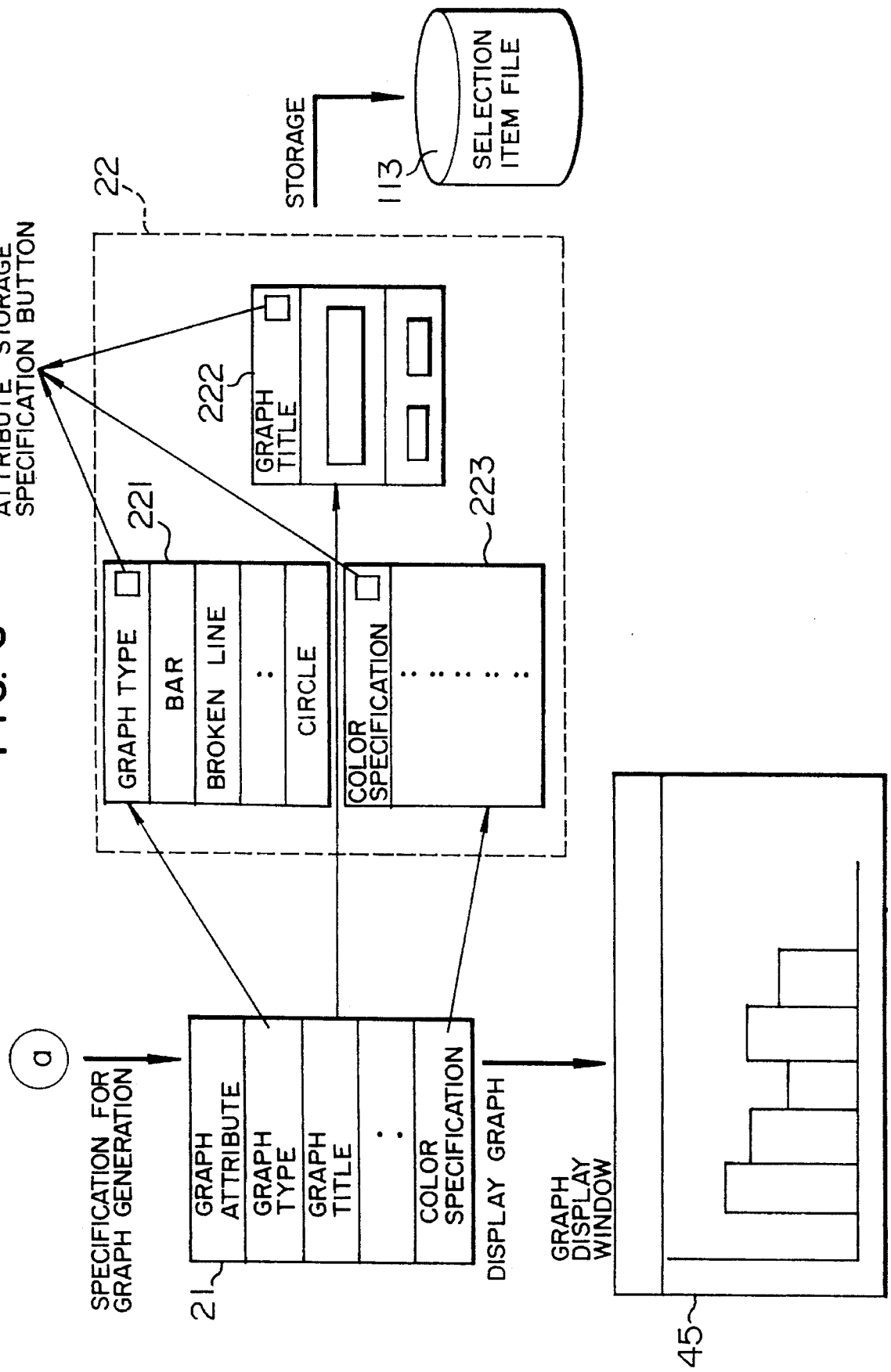
FIG. 6 is a last half configuration diagram showing changes in the screen image contents prior to the attribute registration in the first embodiment.

FIGS. 5 and 6 are explanatory diagrams useful to explain changes in the contents displayed in the screen image prior to the completion of the graph attribute registration in accordance with the graph generation function.

First, the procedure before the completion of the graph attribute registration is as follows.

(1) Input data in a table of a main window 43.

(2) Select table data to generate a graph.

(3) Select an operation item "graph creation" in a menu display column of the main window 43.

(4) There is displayed a graph window 44. In this situation, the attributes are set to default values.

(5) To set attributes to the generated graph, select "graph attribute" in a menu display screen image of the graph window 44.

(6) In response to presentation of the graph setting attribute selecting screen 21, select attributes to be set by the user.

(7) Each attribute setting screen image 22 is displayed. Designate the setting item in this screen image.

(8) After the setting is finished, for the attributes to be stored by the user, depress the attribute registration specification button 23 disposed in each of the attribute setting screen images 221 to 223. Resultantly, there are set the attributes specified by depressing the button 23; moreover, "1" is set to the flag only for the setting items of the attributes.

(9) After the attributes are set, the screen image 21 is closed and the graph is again displayed.

Figure 7:
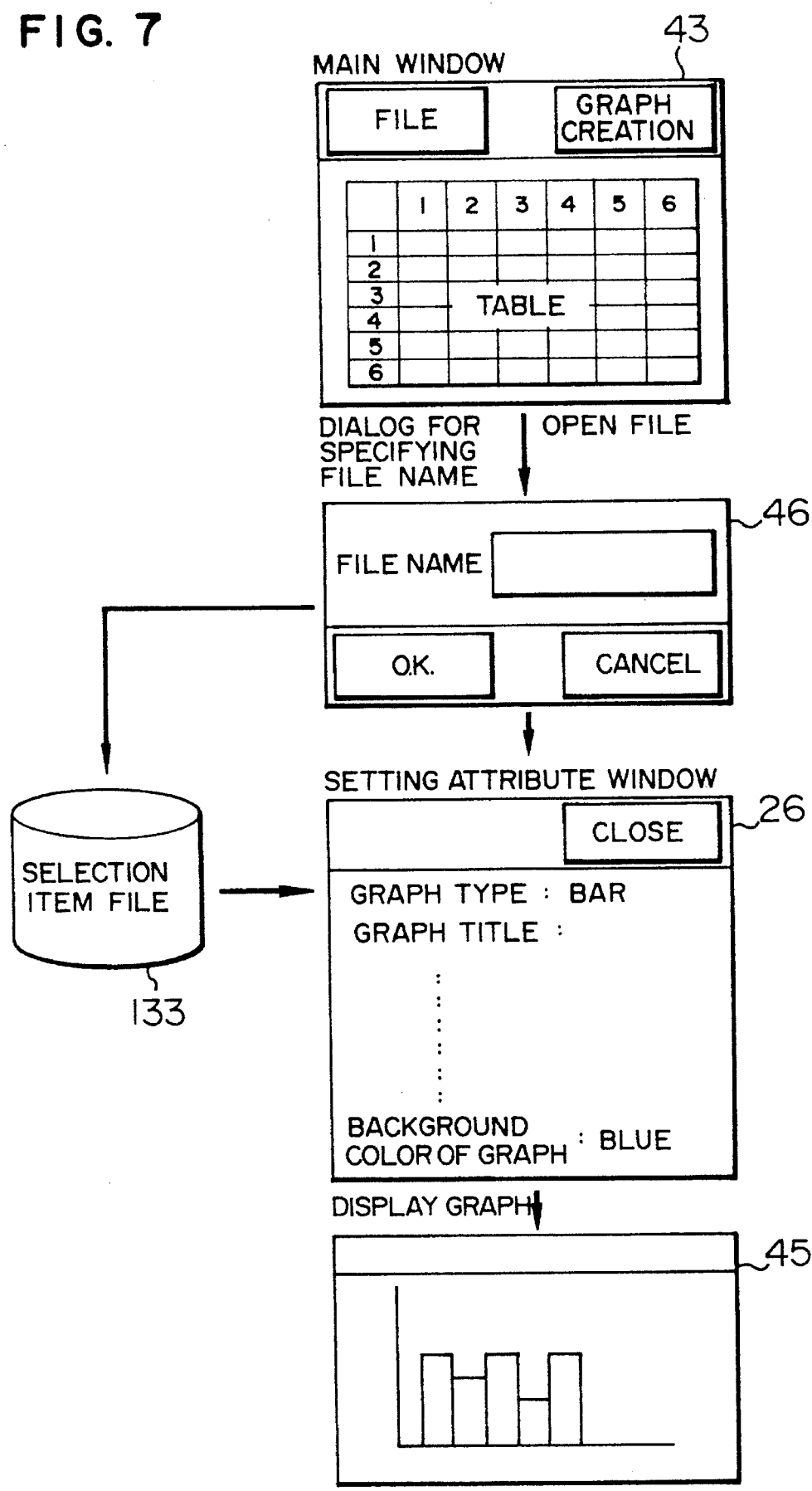
FIG. 7 is a diagram showing a screen configuration after the attribute registration in the first embodiment.

After the specified and/or selected attributes are stored in the selection item file 133, when an access is attempted to the file 133, the operation is accomplished according to a processing flow as shown in FIG. 7.

In this operation, the procedure to set graph attributes is as follows.

(1) Input data to a table in the main window 43.

(2) Select table data to generate a graph.

(3) Select "file" from the menu display column of the main window 43 and specify "open" for the file 133.

(4) Specify in a file name specifying window 46 a name of the setting attribute file thus stored.

(5) According to the specified file name, obtain the specified and selected attributes from the file 133 to display the attributes in the form of the attribute setting window 26 in a screen image. In response thereto, conduct a change operation when necessary. FIG. 8 shows a circle graph displayed when a selection item set as "graph type=bar" is changed to "graph type=circle" in the window 26.

In consequence, comparing the attribute setting procedure of FIGS. 5 and 6 with that of FIG. 7, it is to be understood that a plurality of windows 44, 21 and 22 are also called in the operation of the windows to set attributes according to the procedure of FIGS. 5 and 6; whereas, only one screen image is opened to set a plurality of attributes in the procedure of FIG. 7.

According to the embodiment as described above, selection items selected and set in a process up to the completion of the selection and setting operation achieved by the user for a plurality of items displayed on the display screen are memorized for each selection and setting operation such that in an operation to be executed layer by use of the items thus selected and set, there is displayed a screen image including the memorized selection items. Consequently, once the items necessary to execute certain processing are selected and are set, a screen image including only the necessary items is displayed thereafter so that these items are reconfirmed or changed therein. This hence enables the user to effectively conduct a selection and setting operation of the necessary items through a very simple operation. As a result, particularly, in a case where the items to be selected astride a plurality of screen images or where only a portion of the setting items is to be altered, where an identical routine job is repeatedly carried out, or where the selection items thus set are desired to be confirmed in a list, it is possible to considerably improve the efficiency of operation.

In the embodiment above, there are memorized only the selection items specified and selected by the user in the setting of graph attributes according to the graph creation function so that the items are utilized again. Next, description will be given of a second embodiment in which there is provided means for the user to beforehand define correlations between the items so as to memorize not only the items specified and selected by the user but also other items defined by the user due to correlative relations with the selection items.

First, assuming the system configuration to be similar to that of FIG. 1, only the portions thereof related to different procedures will be described.

A request to define correlations between attributes is first inputted by the user from the input device 19.

The request for definition of correlations is then sent via the input/output information controller 15 to the event information analysis module 112 such that the contents thereof are analyzed therein.

According to a result of the analysis, the main controller 111 invokes the integral window creation logic 113 to generate a graph attribute correlation definition screen image 47 as shown in FIG. 9 and then transmits the screen image 47 via the module 112 and the controller 15 to the display 18 so as to display the screen image 47 as shown in FIG. 9.

The screen image 47 of FIG. 9 includes an area 471 of an attribute identifier (ID) beforehand assigned to each attribute, an area 472 of each attribute name and an additional registration attribute name area 473 in which an attribute identifier of an attribute recognized to have correlation with the pertinent attribute by the user or an attribute identifier of an attribute desired to be registered together with the pertinent attribute in the attribute registration is stored.

The user inputs a correlation attribute identifier 471 regarded as necessary in the area 473 of the definition screen image 47. For example, in a case where a graph type is specified for registration by the user, when a line type (attribute identifier=2) and a title (attribute identifier=3) are to be set as attributes associated with "graph type" the attribute identifier of line type=2 and the attribute identifier=3 are inputted to the area 473 associated with "graph type".

The information items are once stored in the selection item file 133 so as to be retrieved when the attribute is specified or selected by the user.

When the correlation attribute identifier 471 is beforehand registered for the specified or selected attribute, "1" is assigned to not only the specified or selected attribute but also to the correlation attribute element ATTR 244, thereby storing the items later.

Figure 3:
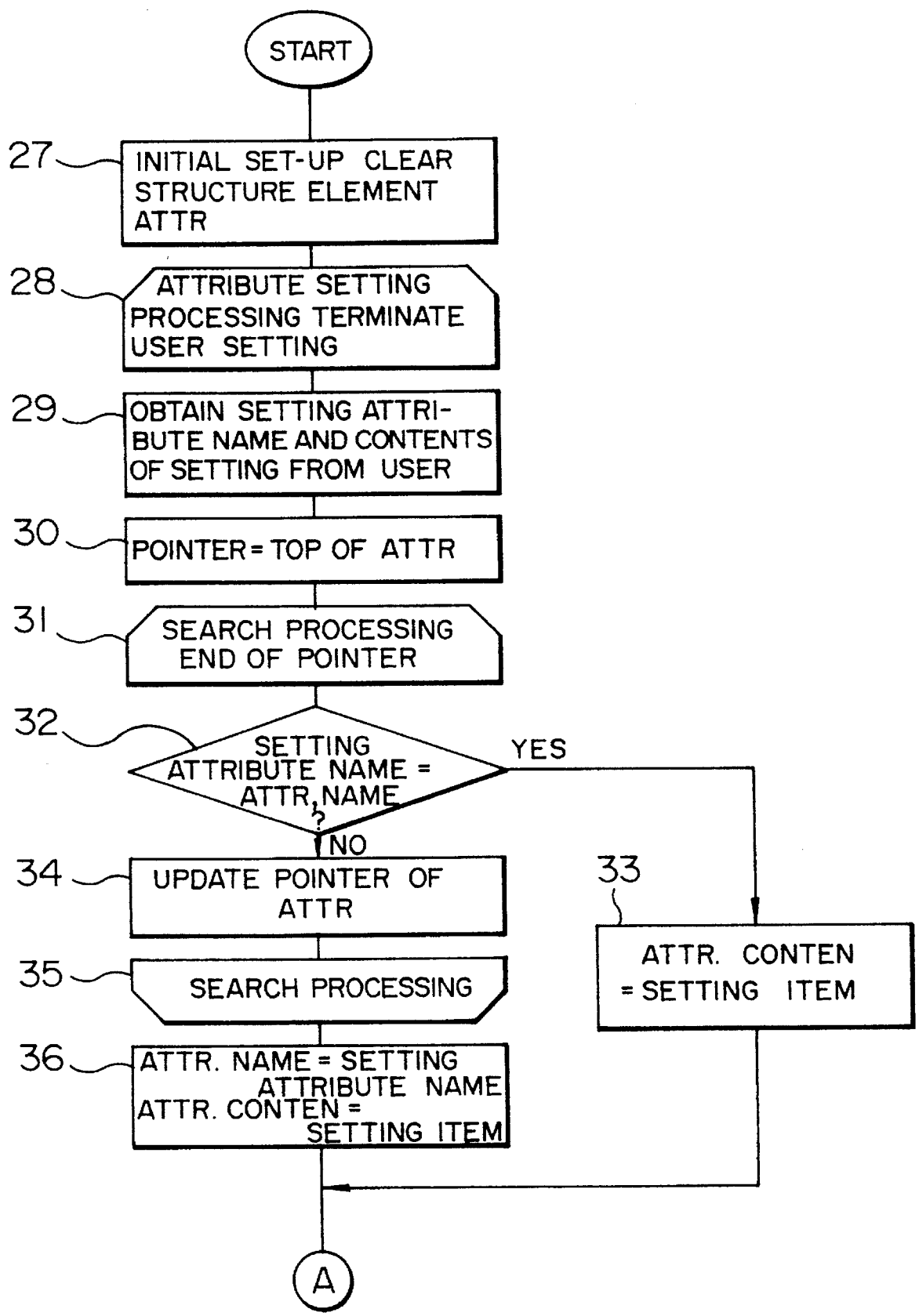
FIG. 3 is a flowchart showing a first half portion of an attribute setting procedure of the first embodiment.
Figure 4:
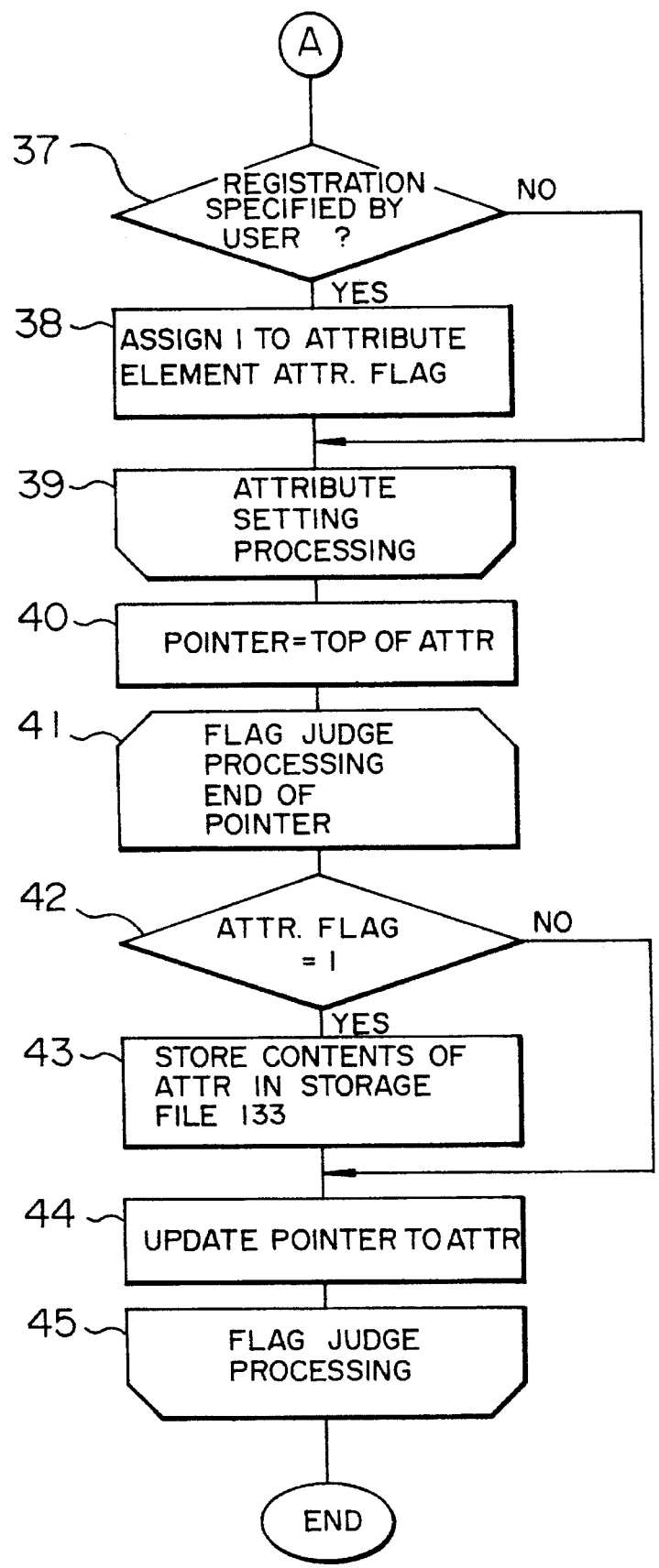
FIG. 4 is a flowchart showing a last half portion of the attribute setting procedure of the first embodiment.

In this manner, the correlations between the attributes are enabled to be recognized by the system so as to be registered according to the flowcharts of FIGS. 3 and 4. Specifically, in a step 41 conducting the flag judge processing, the item is registered as an attribute having a correlation together with the specification and selection attribute.

In the embodiment above, since the items selected and set as well as relational items defined in the correlation definition screen image are displayed, the selection and setting operation can be effectively accomplished also for the relational items through quite a simple operation while confirming the correlations.

Incidentally, in conjunction with the embodiment, description has been given of a graph creation function by way of example. However, also in other information processing functions, the operation can be simplified in a similar fashion.

Moreover, in the first embodiment, there are memorized items selected and specified in a process up to completion of the selection and setting operation of the user. However, there may be memorized only the items for which the user conducts the change operation in the plural items displayed on the display screen, thereby displaying a screen image including only the memorized items.

Also in this case, like in the embodiment above, the user can efficiently select and set necessary items through a very simple operation.

In addition, there may be disposed item specifying means to specify items necessitated by the user to display a screen image including the items specified by the means.

Also in this case, as in the case above, the user can efficiently select and set necessary items through a very simple operation.

In this connection, according to the respective embodiments above, items of graph attributes are used as examples for description; however, the items include such various contents to be set prior to the processing unique to the user as an operation item and a processing procedure item.

For example, considering an application of the present invention to guidance screen images in a case where a customer uses a cash dispenser of a bank, there is ordinarily presented guidance to insert a passbook or a card and then an input indication guidance for a security number; thereafter, input indication guidance for the amount of money. However, for a customer registered in advance, the system may be configured such that the two leading guidance steps are skipped so as to present the input indication guidance for the amount only when a passbook or a card is inserted. In this case, for the particular customer, only the minimum processing procedure necessary for the customer is displayed in the display screen.

In accordance with the present invention as described above, items selected and set in a process up to the completion of the selection and setting operation achieved by the user for a plurality of items displayed on the display screen are memorized for each selection and setting operation such that in an information processing to be executed later by use of the items thus selected and set, there is displayed a screen image including the memorized selection items. Consequently, once the items necessary to execute certain processing are selected and are set, a screen image including only the necessary items is displayed thereafter so that these items are re-confirmed or changed therein. This hence enables the user to effectively conduct a selection and setting operation of the necessary items through a very simple operation. As a result, particularly, in a case where the items to be selected astride a plurality of screen images or where only a portion of the setting items is to be altered, where an identical routine job is repeatedly carried out, or where the selection items thus set are desired to be confirmed in a list, it is possible to considerably improve the efficiency of operation.

Furthermore, there is presented a screen image including only the items for which the user conducts the change operation in the plural items displayed in the screen image. Consequently, as in the case above, the user can efficiently select and set necessary items through a very simple operation.

In addition, there is displayed a screen image including items specified by the item specifying means. In consequence, like in the case above, the user can efficiently select and set necessary items through a very simple operation.

Moreover, since the items selected and set as well as relational items defined in the correlation definition screen are displayed, the selection and setting operation can be effectively accomplished also for the relational items through quite a simple operation while confirming the correlations.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A user interface customizing method in an information processing system in which processing is executed in association with a selection and setting operation repeatedly conducted by a user for a plurality of items displayed in a screen image, comprising the steps of:

storing for each selection and setting operation items selected and set in a process in which the user completely accomplishes the selection and setting operation for the plural items displayed in the screen image; and displaying, in a same selection and setting operation to be executed later for the same items thus selected and set, a screen image instead including selected and set items stored in the storing step.

2. A user interface customizing method in an information processing system in which processing is executed in association with a selection and setting operation repeatedly conducted by a user for a plurality of items displayed in a screen image, comprising the steps of:

storing for each selection and setting operation items selected and set in a process in which the user completely accomplishes the selection and setting operation for the plural items displayed in the screen image;

updating at least one of the items selected and set through the selection and setting operation; and displaying, in a same selection and setting operation to be executed later for the same items thus selected and set, a screen image including last selected and set items instead of items selected and set throuqh the selection and setting operation.

3. A user interface customizing method in an information processing system in which processing is executed in association with a selection and setting operation repeatedly conducted by a user for a plurality of items displayed in a screen image, comprising the steps of:

setting relationships between the plural items previously defined by the user;

storing for each selection and setting operation, selection items selected and set in a process in which the user completely accomplishes the selection and setting operation for the plural items displayed in the screen image and relational items set in the setting step; and displaying, in a same selection and setting operation to be executed later for the same items thus selected and set, a screen image instead including selected and set items stored in the storing step.

4. A user interface customizing apparatus in an information processing system in which processing is executed in association with a selection and setting operation repeatedly conducted by a user for a plurality of items displayed in a screen image, comprising:

storage means for storing therein for each selection and setting operation items selected and set in a process in which the user completely accomplishes the selection and setting operation for the plural items displayed in the screen image; and display means for generating and displaying, in a same selection and setting operation to be executed later for the same selection items thus selected and set, a screen image instead including selected and set items stored in the storage means.

5. A user interface customizing apparatus in an information processing system in which processing is executed in association with a selection and setting operation repeatedly conducted by a user for a plurality of items displayed in a screen image, comprising:

storage means for storing for each selection and setting operation items selected and set in a process in which the user completely accomplishes the selection and setting operation for the plural items displayed in the screen image;

update means for updating at least one of the items selected and set throuqh the selection and setting operation; and display means for generating and displaying, in same selection and setting information processing operation executed later for the same selected and set items thus selected and set, a screen image including last selected and set items instead of items selected and set throuqh the information processing operation.

6. A user interface customizing apparatus in an information processing system in which processing is executed in association with a selection and setting operation repeatedly conducted by a user for a plurality of items displayed in a screen image, comprising:

setting means for setting relationships between the plural items previously defined by the user;

storage means for storing therein for each selection and setting operation selection items thus selected and set in a process in which the user completely accomplishes the selection and setting operation for the plural items displayed in the screen image and relational items set in the setting means; and display means for generating and displaying, in a same selection and setting operation to be executed later for the same items thus selected and set, a screen image instead including selected and set items stored in the storage means.

7. A user interface customizing method in an information processing system in which processing is executed in association with a selection and setting operation repeatedly conducted by a user for a plurality of items displayed on a screen, comprising the steps of:

storing a set of items of graph attributes each selected through selection and setting operation from plural items displayed on the screen;

displaying the set of items stored in the storing step instead of repeating the selection and setting operation for the same set of items of graph attributes; and producing a graph from a table data based on the set of items of graph attributes for displaying the graph on the screen.

8. A user interface customizing method according to claim 7, further comprising:

updating at least one of the items displayed in the displaying step before producing the graph.

* * * * *